US011828583B2

(12) United States Patent
Kirschner

(10) Patent No.: US 11,828,583 B2
(45) Date of Patent: Nov. 28, 2023

(54) DEVICE FOR DETERMINING THE THICKNESS OF AN OBJECT

(71) Applicant: MICRO-EPSILON Messtechnik GmbH & Co. KG, Ortenburg (DE)

(72) Inventor: Gerhard Kirschner, Passau (DE)

(73) Assignee: MICRO-EPSILON MESSTECHNIK GMBH & CO. KG, Ortenburg (DE)

( * ) Notice: Subject to any disclaimer, the term of this patent is extended or adjusted under 35 U.S.C. 154(b) by 317 days.

(21) Appl. No.: 17/299,219

(22) PCT Filed: Nov. 6, 2019

(86) PCT No.: PCT/DE2019/200124
§ 371 (c)(1),
(2) Date: Jun. 2, 2021

(87) PCT Pub. No.: WO2020/125873
PCT Pub. Date: Jun. 25, 2020

(65) Prior Publication Data
US 2022/0042788 A1   Feb. 10, 2022

(30) Foreign Application Priority Data

Dec. 20, 2018  (DE) ..................... 10 2018 222 678.4
Dec. 21, 2018  (DE) ..................... 10 2018 222 873.6

(51) Int. Cl.
*G01B 11/06* (2006.01)
*B21B 38/04* (2006.01)

(52) U.S. Cl.
CPC .............. *G01B 11/06* (2013.01); *B21B 38/04* (2013.01)

(58) Field of Classification Search
CPC ................................ G01B 11/06; B21B 38/04

USPC ......................................................... 356/630
See application file for complete search history.

(56) References Cited

U.S. PATENT DOCUMENTS 5,164,048 A * 11/1992 Bossen ................... G01N 23/16
                                                                162/263
2015/0226549 A1* 8/2015 Wu ....................... G01B 15/025
                                                                702/167

FOREIGN PATENT DOCUMENTS

| CN | 1958184 A | 5/2007 | |
| CN | 104264555 A * | 1/2015 | ............ G01B 11/00 |
| CN | 104264555 A | 1/2015 | |
| DE | 202014001175 U1 | 5/2015 | |

(Continued)

OTHER PUBLICATIONS

International Preliminary Report on Patentability for PCT/DE2019/200124 dated Jun. 16, 2021 (7 pages).

(Continued)

*Primary Examiner* — Michael A Lyons
*Assistant Examiner* — Omar H Nixon
(74) *Attorney, Agent, or Firm* — Alston & Bird LLP

(57) ABSTRACT

With regard to a reliable measurement of the thickness of an object (4) even in an environment with high temperatures, a device (1) is provided for determining the thickness of an object (4), more particularly a strip-like or flat object (4), preferably for use in a hot rolling process, having a frame (2) with at least one leg (5, 6), the at least one leg (5, 6) having a sensor (8a, 8b) for the contactless measuring of the distance to the object (4), which device is characterised in that the at least one leg (5, 6) has a structure consisting of a plurality of layers in order to reduce the temperature effect on the frame (2) and/or on the sensor (8a, 8b).

20 Claims, 4 Drawing Sheets

(56) References Cited

FOREIGN PATENT DOCUMENTS

DE 202014001175 U1 * 6/2015 ............. B21B 38/04
JP H0783635 A 3/1995

OTHER PUBLICATIONS

International Search Report (ISA/EP) for PCT/DE2019/200124 dated Mar. 5, 2020 (5 pages).
Written Opinion (ISA/EP) for PCT/DE2019/200124 dated Mar. 5, 2020 (6 pages).

* cited by examiner

DEVICE FOR DETERMINING THE THICKNESS OF AN OBJECT

CROSS REFERENCE TO RELATED APPLICATIONS

This application is a national stage application, filed under 35 U.S.C. § 371, of International Application No. PCT/DE 2019/200124, filed Nov. 6, 2019, which claims priority to Germany Application No. 10 2018 222 678.4, filed Dec. 20, 2018, and Germany Application No. 10 2018 222 873.6, filed Dec. 21, 2018, the contents of all of which as are hereby incorporated by reference in their entirety.

BACKGROUND

Technical Field

The invention relates to a device for determining the thickness of an object, in particular a strip-shaped or plate-shaped object, preferably for use in a hot rolling process, comprising a frame having at least one leg, wherein the at least one leg comprises a sensor for contactless measuring of the distance to the object.

Description of Related Art

Such devices are known from practice and exist in a variety of embodiments, whereby the respective frames are, for example, configured as so-called C-shaped frames or measuring frames having two legs which are coupled with a connecting piece and between which an object to be measured or a measurement object is inserted for the measurement. Suitable sensors for measuring a distance are then often attached to the two legs.

To measure the thickness of moving or stationary, strip-shaped or plate-shaped materials, measuring systems are often used in which distance sensors specifically are mounted in a C-shaped measuring frame. A distance sensor above and a distance sensor underneath the strip-shaped or plate-shaped measurement object measure the distance from the respective sensor to the surface of the object. The thickness of the object can be determined from the known distance between the sensors. The problem here, however, is that the distance between the sensors can change due to external influences such as temperature changes, for example. A temperature change can cause the frame structure to expand or deform as a result of the material's own coefficient of thermal expansion, which changes the relative position of the sensors to one another and leads to measurement errors in the thickness measurement. Unevenly occurring temperatures (temporally and spatially) can lead to stresses in the frame structure caused by varying temperature expansion, which likewise adversely affect the measurement.

There are different concepts in terms of design and material composition which are intended to make it possible to provide stable measurement values using an appropriate device, for example in the form of a C-frame, despite temperature changes in the environment and/or in the target or object. The conventional solutions are usually suitable for applications with comparatively stable ambient conditions.

With respect to the state of the art, a corresponding device for determining the thickness of an object in the form of moving, strip-shaped and plate-shaped materials is known from DE 20 2014 001 175 U1, for example, whereby this device is preferably used in cold rolling. According to this prior art, the legs of a C-frame are wrapped with copper pipes through which liquid flows in a closed circulation, without cooling or heating. The objective of this arrangement is to prevent uneven temperature changes in the C-frame. The intent is to determine the effect of temperature changes and compensate said changes with strain gauges. In cold rolling, the material is not heated prior to rolling. Only the applied deformation energy causes the material to heat up slightly as it passes through the rolling mill, whereby said heating is a function of the ambient conditions and any cooling.

This design does not provide a solution for handling the thermal stress that occurs in the hot rolling area, since temperatures up to 1200° C. are reached during hot rolling.

In the case of stronger fluctuations of temperature and thermal radiation in the environment, such known solutions have the disadvantage that, in connection with the thermal conduction from the measuring leg to the copper pipe, relatively large amounts of energy are introduced or dissipated in a localized manner by the liquid circulation system. This creates a number of problems, such as a rapid change in the distance between the sensors caused by the localized thermal expansion, for example, whereby distortion due to temperature differences between the coolant supply and the coolant return and the resulting temperature differences on the frame can occur as well. In the known device, this is at odds with the desired inert system, which should be characterized in that changes in the ambient conditions affect the distance between the sensors only so slowly that, between two possible calibrating or zeroing cycles, no errors relevant to the measurement accuracy occur.

For C-frames for the hot rolling area, the connection length along the frame between the two sensors (one per side of the material) is typically several meters. This connection length is a sum of the length of the upper and the lower leg of the C-frame and the connecting piece between the legs, which substantially defines the measuring distance between the sensors. The effect of a uniform change in temperature is substantially a change in length in the region of the connecting piece, whereby this change in length directly affects the thickness measurement value. Since the change in length of the legs is approximately identical and perpendicular to the measurement axis, this effect on the thickness measurement value can be neglected.

If there is also a lateral displacement of the sensors due to different length expansions of the upper and lower legs, the measuring points of the sensors are no longer directly opposite to one another, which leads to errors in the thickness measurement, especially if the measurement object or object is tilted.

In practice, varying temperature changes within a leg (on the side facing the second leg and on the side facing away from the second leg) have serious consequences. This is because it causes a distortion comparable to the distortion of bimetal when it is heated, which has a direct effect as a measurement error.

In practice, however, the temperature input to the C-frame is not uniform. The reason for this, on the one hand, is the high loads caused by thermal radiation from the target during hot rolling, whereby approximately 170 kW/m² is used as the magnitude for the thermal radiation from red-hot steel, and, on the other hand, the resulting thermal convection that occurs in this environment. Even a frame made of a material with a particularly low coefficient of thermal expansion, such as Invar®, would have a temperature drift that is far too large to allow a precise thickness measurement.

BRIEF SUMMARY

The underlying object of the present invention is therefore to specify a device of the abovementioned type, with which a reliable measurement of the thickness of an object is made possible even in an environment with high temperatures with structurally simple and inexpensive means.

The aforementioned object is achieved according to the invention by a device having the features of claim 1. The device according to the invention is therefore configured and further developed such that, in order to reduce a temperature effect on the frame and/or the sensor, the at least one leg has a structure consisting of a plurality of layers.

According to the invention, it was first recognized that the aforementioned object is achieved in a surprisingly simple manner by a clever configuration of a leg of the frame. Specifically, to make it possible to reduce, preferably in several stages, a temperature effect on the frame and/or the sensor at particularly high and/or low temperatures and/or in the case of strong temperature changes during a measurement, the at least one leg has a multilayered structure. Each layer can in itself realize a reduction of a temperature effect on the frame and/or the sensor, for example by dissipating heat or protecting against thermal radiation. On the one hand, with the device according to the invention, it is possible to protect the sensor or even a plurality of sensors from a temperature effect caused, for example, by too high or very high ambient temperatures. On the other hand, to achieve the objective of a particularly reliable measurement with a high measuring accuracy of the thickness measurement, it is of great importance for the frame, for example including a base frame element, and any necessarily provided connecting pieces between the legs, and consequently a connection between the sensors, to be protected as well. This is likewise achieved by the layer structure of the at least one leg according to the invention. Ultimately, measurement errors occur because the structure of the device with the frame and its components bend as a result of the temperature. It is possible to implement such a multilayered structure cost-effectively.

Consequently, the device according to the invention provides a device with which a reliable measurement of the thickness of an object is made possible even in an environment with high temperatures with structurally simple and inexpensive means.

In an advantageous design of the device, a first layer comprises a base frame element which is preferably configured as a hollow body or a first layer is formed by such a base frame element. This first layer provides a secure and stable basic structure for the device.

The sensor can further advantageously be associated with the base frame element or disposed in the base frame element. In particular when the sensor is disposed in the base frame element, the sensor is shielded from external temperature effects by the base frame element.

The base frame element can further advantageously comprise a cooling device, which can be implemented as an active or a passive cooling device. The cooling device can be securely disposed in or on the base frame element and more preferably in a connecting piece of the base frame element, for example in the case of a C-shaped configuration of the frame. A secure and protected placement of the cooling device is thus realized, whereby this placement also provides a particularly compact structure of the device.

With a view to a particularly reliable cooling effect, the cooling device can comprise a cooling register filled with a cooling medium. The purpose of the cooling register is to cool and/or regulate the temperature, for example, of a fluid, such as ambient air, used for cooling. In particular, in the case of such an implementation of a cooling device, the base frame element can be configured such that a specifiable fluid, preferably ambient air, can flow through it. A fluid, the temperature of which is regulated by means of the cooling device and the cooling medium, can be flowed through the base frame element to the sensor in order to achieve a corresponding cooling effect or temperature regulation at the sensor. Not only ambient air can be used as the fluid. Depending on the application, suitable gases or liquids, for example water, can be used as fluid.

A fluid flow can be implemented in a particularly advantageous manner using a forward flow from the cooling device to the sensor and a return flow from the sensor back to the cooling device. A preferably closed circulation of the fluid can thus be realized.

In a further advantageous design of the device according to the invention, a second layer can comprise a preferably substantially closed jacket for the first layer or can be formed by such a jacket. This second layer which encases the first layer essentially creates a protective shield against an outside temperature effect for the first layer. Thermal radiation can be kept away from the first layer to a significant extent by the second layer. The structure consisting of a first layer and a second layer encasing the first layer can furthermore create a flow channel for a fluid flow, preferably in conjunction with a cooling device. The return flow or the forward flow, for example to or from a cooling device, can then be implemented between the jacket and the base frame element. A corresponding flow channel can be formed by a gap or intermediate space between the first layer and the second layer.

The jacket can further advantageously be composed of a plurality of segments, whereby the individual segments are preferably coupled by means of elastic membranes which preferably connect the individual segments to one another in an airtight manner and can absorb and compensate changes in length that occur as a result of temperature expansions.

In addition to the first and/or the second layer, a further layer comprising a radiation protection means, preferably a radiation protection sheet, for the first or the second layer can be provided or is formed by such a radiation protection means. Such a further layer can particularly advantageously form a further stage for reducing external temperature effects on the sensor.

With a view to a reliable compensation or absorption of temperature-related length changes or expansions of the individual layers, the further layer can be mounted on the first layer or on the second layer so as to be movable or displaceable relative to the first layer or the second layer, preferably by means of a guide, in particular a slotted guide. The further layer can be mounted on the first layer in cases in which no second layer is implemented.

The jacket and/or the radiation protection means can further advantageously be made of a preferably polished and/or shiny metal. This enables a particularly reliable reflection of thermal radiation impinging on the jacket or the radiation protection means with a corresponding protective effect for the sensor. Particularly advantageously, a material having a low emissivity can be provided as the material for the jacket and/or the radiation protection means. Such a material reflects incident thermal radiation very efficiently.

With a view to a reliable measurement, the first layer and/or the second layer and/or the further layer can comprise a passage, preferably closed by means of a glass or heat protection glass, for sensor signals to and/or from the object.

This ensures that optical sensor signals, for example, can pass undisturbed through the implemented layers between the sensor and the object.

With a view to further reducing temperature effects on the frame and/or the sensor, an intermediate space through which a specifiable fluid, preferably ambient air, can flow can be formed between the first layer and the second layer and/or between the second layer and the further layer in order to create a fluid layer. Such a fluid layer forms a reliable thermal insulation between the respective layers, since ambient air in particular has a highly insulating effect. It is also possible to use suitable insulating gases as the fluid.

To avoid thermal conduction between the layers, the first layer can be coupled to the second layer or the further layer and/or the second layer can be coupled to the further layer via a locally acting connecting means. Such a connecting means can be implemented by one or more sporadically disposed spacers between the layers, whereby such a locally acting connecting means allows only very low thermal conduction between the layers.

With the device according to the invention, it is possible to implement a device having a C-shaped frame, for example, which is inexpensive and in which the connection between the two sensors is also largely decoupled from a temperature effect of the environment and the resulting force effect. Any additional cooling capacity required for the frame and the sensors can be kept to a minimum. In this respect, the device according to the invention realizes a concept with which the effect of ambient conditions on the thickness measurement is minimized.

Essential aspects of design examples of the device according to the invention are summarized illustratively in the following:

With the present invention, it is possible to realize a multistage cooling concept with a preferably closed cooling circuit. In the case of the example configuration of the frame as a C-shaped frame, the cooling concept initially consists of decoupling the C-shaped frame or connecting frame of the sensors from temperature effects from the environment. This can be achieved with a variety of measures to minimize the effect of the ambient temperature, including the temperature input to the frame structure caused by thermal radiation. In the following, the structure of a design example of a C-frame according to the invention is described from the outside to the inside:

In a first stage, a radiation protection sheet is applied as the outermost layer, so to speak. It consists of polished/shiny metal, for example a steel or stainless steel having a low emissivity factor as a measure for the directional thermal emissivity. Since, according to Kirchhoff's law, the directional thermal emissivity is equal to the absorptivity, a material having a low emissivity factor or emissivity reflects incident thermal radiation very efficiently.

The radiation protection sheet is suspended on a jacket. The connection is configured such that different thermal expansion of the materials used is compensated, for example with the aid of a slotted guide.

In an experimentally installed device, the temperature of the side of the sheet facing away from the target increases by up to 150° C. within less than ten minutes.

A second stage consists of an air gap between the radiation protection sheet and the underlying jacket. Air has insulating properties and also serves to transport heat. The first radiation protection layer, the radiation protection sheet, is not sealed in an airtight manner, so that, in the second stage, heat is dissipated by convection.

A third stage consists of the jacket, which is again made of polished/shiny metal, for example a steel or stainless steel with low emissivity.

This jacket encloses a base frame element or the base C-frame in an almost airtight manner, but is mechanically connected to said base frame element only at the base surface, the intersection with the linear axle, and in the front region of the measuring legs. In the area in which the jacket covers the sensors, the jacket comprises a respective opening so that the light path of the optical sensors is not adversely affected. In order to create an airtight seal, the openings are closed with a heat protection glass. The heat protection glass is transparent to the optical radiation of the sensors, for example laser radiation, but blocks thermal radiation in the infrared spectrum. This makes it possible for the temperature fluctuation on the inside of the jacket or jacket sheet to be only about a quarter of that of the radiation protection sheet.

A fourth stage again consists of an air gap, here between the jacket and the base frame element. Air circulates inside said air gap in an active and closed cooling circuit.

A final stage is formed by the actual base C-frame or base frame element. Said frame or frame element comprises the sensor receptacles at the ends of the legs and the cooling register inside the connecting piece. These are both implemented as hollow bodies through which the air of the cooling circuit flows.

For airflow, the air enclosed inside the jacket circulates with the aid of a fan as follows: From the fan, which is located inside the connecting piece in the base frame element, the air flows via the cooling register through the legs of the base frame element to the sensors. The cooling register comprises a cooling medium and cooling fins that ensure an efficient transfer of heat from the cooling air to the cooling medium. The heat is dissipated from the base frame element to the outside by means of the cooling medium, for example via an external fan. From the sensors, the air flows between the outside of the base frame element and the jacket back to the fan. As a result, there is virtually no temperature fluctuation at the base frame element.

Therefore, using the abovementioned measures, the high ambient temperature occurring on the outside of the thickness measuring system or the device is very efficiently incrementally reduced to such an extent that moderate temperatures prevail at the base frame element, and thus also at the location of the sensors, which are firstly within the permissible temperature range for the sensors and secondly do not adversely affect the measurement.

However, the resulting stepped temperature profile in the cross-section of the measuring system or device means, for example, that the radiation protection sheet has a significantly higher temperature than the jacket. Due to the different expansion, this leads to a relative displacement of the radiation protection sheet with respect to the jacket.

In order to avoid mechanical stresses, the radiation protection sheet and the jacket are connected to one another at only a few points. Said points are configured such that there is no rigid connection. They are instead mounted in a floating manner. This implementation therefore allows for different thermal expansion of the two layers.

The same applies for the next layer, the jacket, as well. The jacket is divided into a plurality of segments, each of which is connected in an airtight manner to an elastic membrane. The membranes can absorb and compensate the length changes that occur due to temperature expansion. The connecting segments between the upright and the sensor head are likewise mounted in a floating manner in order to minimize fluctuations when forces are introduced into the base frame element.

As a result of the multistage cooling concept, only minimal cooling capacity is required. The majority of the produced radiant heat is already kept away from the jacket by the radiation protection sheet. The back side of the protection sheets is furthermore cooled by the draft created by the convection.

Thermal conduction from the jacket into the base frame element is virtually eliminated structurally by reducing the mechanical connections between the jacket and base frame element. In this stage, the jacket is cooled by the air cooling, whereby only a small cooling capacity has to be provided to the jacket because it can heat up (in practice by up to 40° C.) without affecting the thickness measurement. The heat absorption of the base frame element due to the thermal radiation of the jacket is low in this temperature range, because both the radiating and the absorbing surfaces have a low emissivity factor or emissivity.

The air cooled in the cooling register flows directly in the interior of the base frame element to the sensors, so that both the base frame element and the sensors exhibit virtually no temperature fluctuation during operation.

As a result of the abovementioned measures, the effect of the ambient conditions on the thickness measurement is largely eliminated.

The largest remaining disturbance variable is the varying heating within a respective leg (on the side facing the second leg and on the side facing away from the second leg). Due to the length of the legs, differences in the range of a few $\frac{1}{10}$° C. are enough to produce significant measurement errors. For this purpose, the temperatures at the relevant locations are measured and the effect on the thickness measurement is determined. During operation, the resulting error can be eliminated almost completely by factoring in a correction value.

BRIEF DESCRIPTION OF THE FIGURES

There are various ways to advantageously configure and further develop the teaching of the present invention. For this purpose, reference is made firstly to the subordinate claims and, secondly, to the following explanation of a preferred design example of the device according to the invention on the basis of the drawing. In the context of the explanation of the preferred design example on the basis of the drawing, other generally preferred configurations and further developments of the teaching are discussed as well. In the drawing, the figures show FIG. 1 in a side view (A) and in a front view (B) a design example of a device according to the invention for determining the thickness of an object, FIG. 2 a cross-section, enlarged, through an upper leg of the device according to FIG. 1, FIG. 3 a cross-section, enlarged, through a lower leg of the device according to FIG. 1, and FIG. 4 in a side view, sectioned, the device of FIG. 1.

DETAILED DESCRIPTION OF VARIOUS EMBODIMENTS

Figure 1:
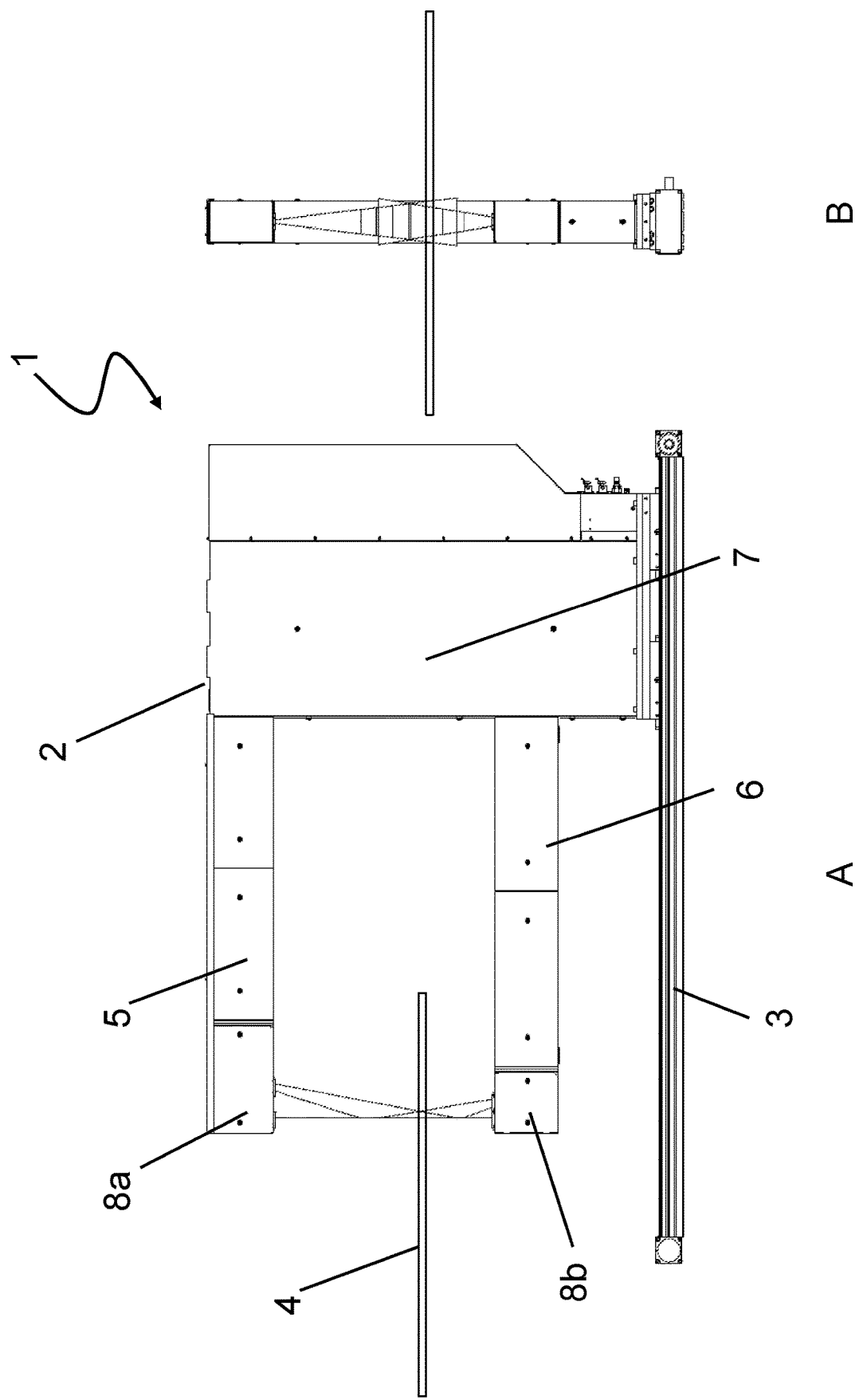

FIG. 1 shows a design example of a device 1 according to the invention in a side view (A) and in a front view (B). A C-shaped frame 2 is mounted on a linear axle 3 such that it can be moved in a traversing manner relative to the object 4 to be measured, for example a steel sheet 4. Thus, a measuring track is recorded transversely to the movement direction of the steel sheet 4. The C-shaped frame 2 consists of an upper leg 5 and a lower leg 6, which are connected to one another via a connecting piece 7. At the outer end of each leg 5, 6 there is a respective optical distance sensor 8a, 8b, for example a laser profile sensor. The upper sensor 8a measures against the upper side of the steel strip or the steel sheet 4, the lower sensor 8b measures against the underside of the steel strip or the steel sheet 4. The two measurement values and the known distance between the sensors 8a, 8b can be used to determine the thickness of the steel strip or the steel sheet 4.

Figure 2:
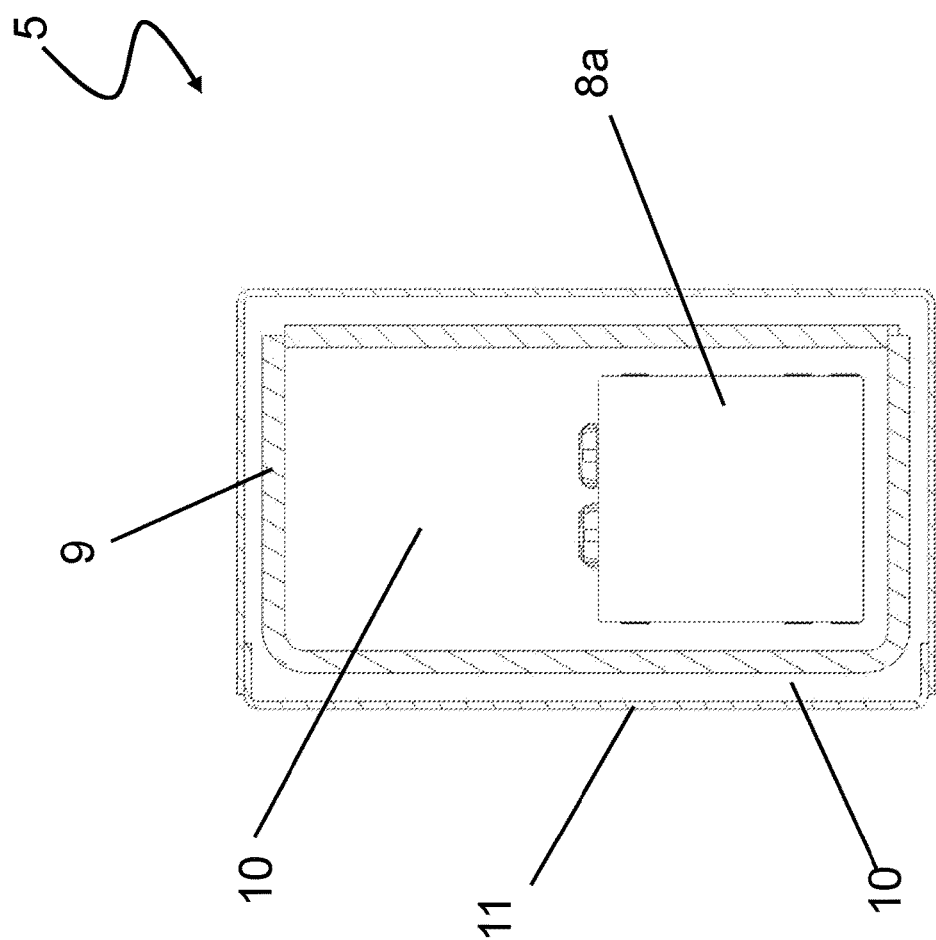

FIG. 2 shows a cross-section through the upper leg 5 of the C-frame 2. The sensor 8a is fastened to an inner base frame element 9. Cooling air 10 flows through the interior of the base frame element 9 and also flows past the sensors 8a, 8b and cools them. The base frame element 9 is surrounded by a jacket 11. Said jacket is disposed at a distance from the base frame element 9; specifically using only a few punctiform fastenings (not shown), so that thermal bridges are ideally avoided. Cooling air 10 also flows between the jacket 11 and the base frame element 9.

Figure 3:
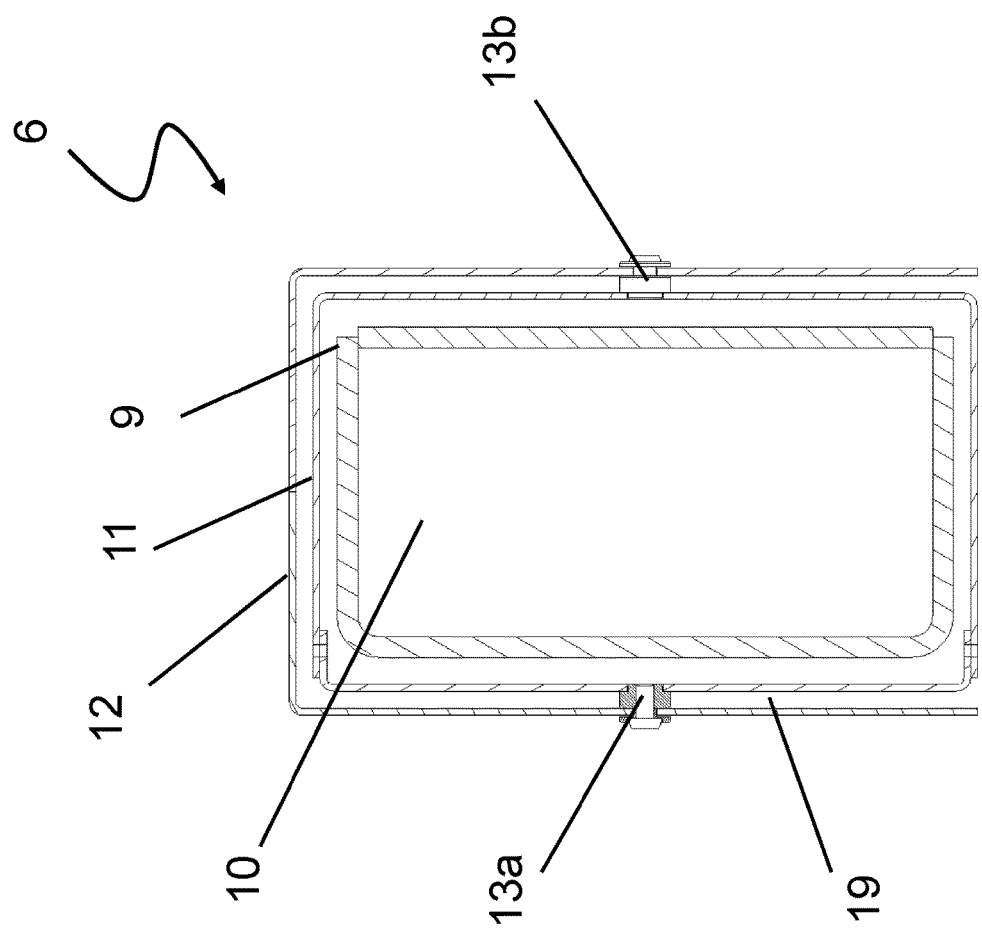

FIG. 3 shows a cross-section through the lower leg 6 of the C-frame 2, whereby the lower leg 6 is additionally provided with a radiation protection sheet 12. This radiation protection sheet 12 is likewise connected to the jacket 11 by means of sporadically disposed spacers 13a, 13b. The spacers 13a, 13b are implemented in a floating manner so that movements of the radiation protection sheet 12 resulting from the different temperature expansion are not transmitted to the jacket 11. The radiation protection sheet 12 is not closed in an airtight manner, so that heating of an air layer 19 between the radiation protection sheet 12 and the jacket 11 is reduced with the aid of the convection.

Figure 4:
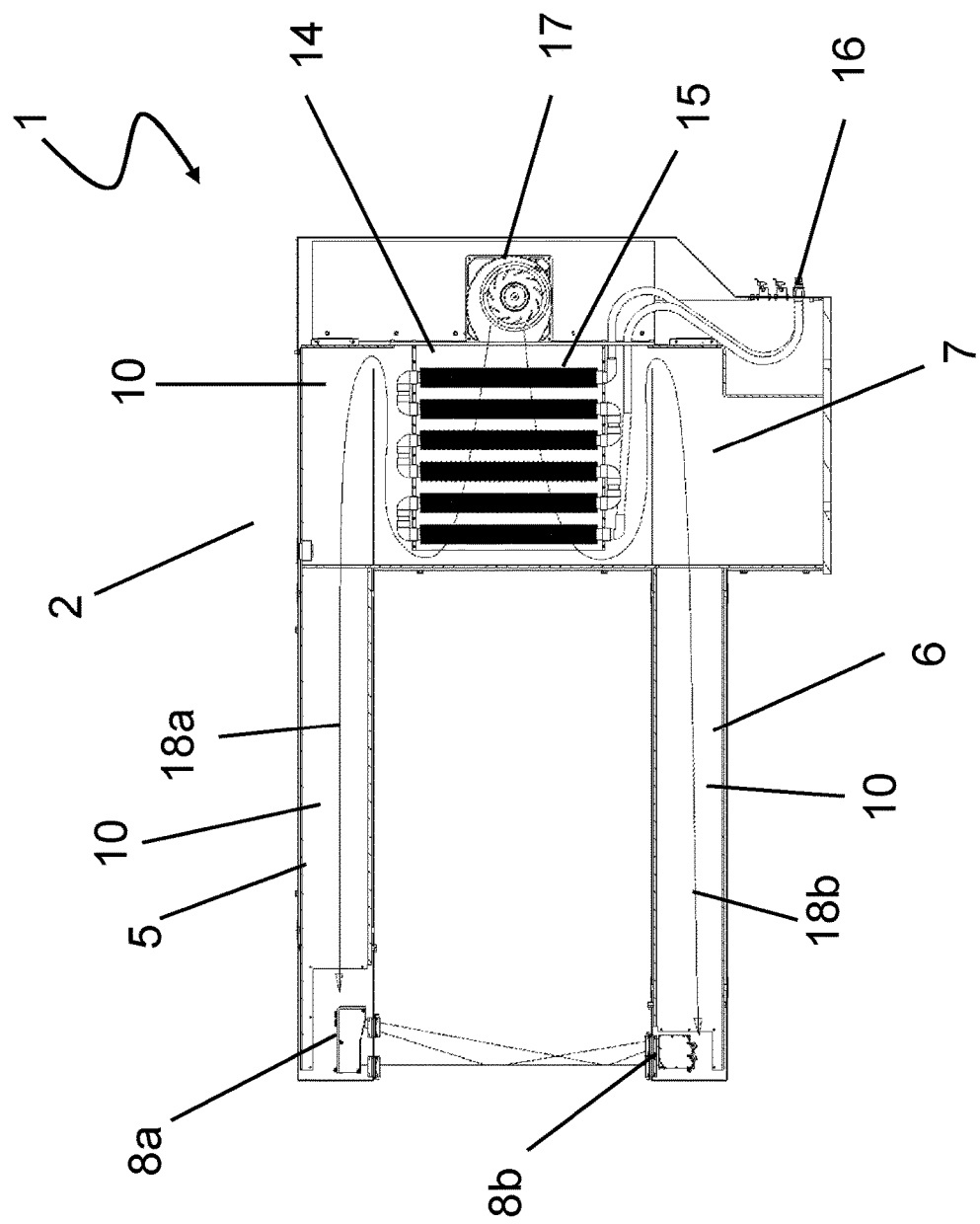

FIG. 4 shows a lateral sectional view through the C-frame 2. A cooling register 14 is provided in the connecting piece 7 between the upper leg 5 and the lower leg 6. The cooling register 14 comprises cooling fins 15 for exchanging heat with the cooling air 10. In the cooling register 14, a cooling liquid is used to remove the heat to the outside via a connector 16. An air flow 18a, 18b is produced inside the C-frame 2 with the aid of a fan 17. The air flows from the cooling register 14 inside the base frame element 9 inside the upper leg 5 and the lower leg 6 to the sensors 8a, 8b. From there, the cooling air 10 then flows in the intermediate space between the base frame element 9 and the jacket 11 back to the cooling register 14, where the cooling air 10 releases the absorbed heat again. Thus, a closed cooling circuit is created inside the C-frame 2.

The design example of the device according to the invention provides a device for determining the thickness of sheet-like or plate-shaped objects 4, in particular for use in hot rolling, which consists of a C-frame 2 having an upper leg 5 and a lower leg 6 and a connecting piece 7, whereby an optical sensor 8a, 8b for determining the thickness is disposed on least on one leg 5, 6. To eliminate temperature effects on the at least one sensor 8a, 8b, the leg 5, 6 of the C-frame 2 carrying the sensor 8a, 8b has a multilayered structure.

With respect to further advantageous configurations of the device according to the invention, reference is made to the summary of the description and to the attached claims in order to avoid significant repetitions. Certain aspects are, however, reiterated below.

Essential aspects of design examples of the device according to the invention are summarized illustratively in the following:

With the present invention, it is possible to realize a multistage cooling concept with a preferably closed cooling circuit. In the case of the example configuration of the frame as a C-shaped frame, the cooling concept initially consists of decoupling the C-shaped frame or connecting frame of the sensors from temperature effects from the environment. This can be achieved with a variety of measures to minimize the effect of the ambient temperature, including the temperature input to the frame structure caused by thermal radiation. In the following, the structure of a design example of a C-frame according to the invention is described from the outside to the inside:

In a first stage, a radiation protection sheet is applied as the outermost layer, so to speak. It consists of polished/shiny metal, for example a steel or stainless steel having a low emissivity factor as a measure for the directional thermal emissivity. Since, according to Kirchhoff's law, the directional thermal emissivity is equal to the absorptivity, a material having a low emissivity factor or emissivity reflects incident thermal radiation very efficiently.

The radiation protection sheet is suspended on a jacket. The connection is configured such that different thermal expansion of the materials used is compensated, for example with the aid of a slotted guide.

In an experimentally installed device, the temperature of the side of the sheet facing away from the target increases by up to 150° C. within less than ten minutes.

A second stage consists of an air gap between the radiation protection sheet and the underlying jacket. Air has insulating properties and also serves to transport heat. The first radiation protection layer, the radiation protection sheet, is not sealed in an airtight manner, so that, in the second stage, heat is dissipated by convection.

A third stage consists of the jacket, which is again made of polished/shiny metal, for example a steel or stainless steel with low emissivity.

This jacket encloses a base frame element or the base C-frame in an almost airtight manner, but is mechanically connected to said base frame element only at the base surface, the intersection with the linear axle, and in the front region of the measuring legs. In the area in which the jacket covers the sensors, the jacket comprises a respective opening so that the light path of the optical sensors is not adversely affected. In order to create an airtight seal, the openings are closed with a heat protection glass. The heat protection glass is transparent to the optical radiation of the sensors, for example laser radiation, but blocks thermal radiation in the infrared spectrum. This makes it possible for the temperature fluctuation on the inside of the jacket or jacket sheet to be only about a quarter of that of the radiation protection sheet.

A fourth stage again consists of an air gap, here between the jacket and the base frame element. Air circulates inside said air gap in an active and closed cooling circuit.

A final stage is formed by the actual base C-frame or base frame element. Said frame or frame element comprises the sensor receptacles at the ends of the legs and the cooling register inside the connecting piece. These are both implemented as hollow bodies through which the air of the cooling circuit flows.

For airflow, the air enclosed inside the jacket circulates with the aid of a fan as follows: From the fan, which is located inside the connecting piece in the base frame element, the air flows via the cooling register through the legs of the base frame element to the sensors. The cooling register comprises a cooling medium and cooling fins that ensure an efficient transfer of heat from the cooling air to the cooling medium. The heat is dissipated from the base frame element to the outside by means of the cooling medium, for example via an external fan. From the sensors, the air flows between the outside of the base frame element and the jacket back to the fan. As a result, there is virtually no temperature fluctuation at the base frame element.

Therefore, using the abovementioned measures, the high ambient temperature occurring on the outside of the thickness measuring system or the device is very efficiently incrementally reduced to such an extent that moderate temperatures prevail at the base frame element, and thus also at the location of the sensors, which are firstly within the permissible temperature range for the sensors and secondly do not adversely affect the measurement.

However, the resulting stepped temperature profile in the cross-section of the measuring system or device means, for example, that the radiation protection sheet has a significantly higher temperature than the jacket. Due to the different expansion, this leads to a relative displacement of the radiation protection sheet with respect to the jacket.

In order to avoid mechanical stresses, the radiation protection sheet and the jacket are connected to one another at only a few points. Said points are configured such that there is no rigid connection. They are instead mounted in a floating manner. This implementation therefore allows for different thermal expansion of the two layers.

The same applies for the next layer, the jacket, as well. The jacket is divided into a plurality of segments, each of which is connected in an airtight manner to an elastic membrane. The membranes can absorb and compensate the length changes that occur due to temperature expansion. The connecting segments between the upright and the sensor head are likewise mounted in a floating manner in order to minimize fluctuations when forces are introduced into the base frame element.

As a result of the multistage cooling concept, only minimal cooling capacity is required. The majority of the produced radiant heat is already kept away from the jacket by the radiation protection sheet. The back side of the protection sheets is furthermore cooled by the draft created by the convection.

Thermal conduction from the jacket into the base frame element is virtually eliminated structurally by reducing the mechanical connections between the jacket and base frame element. In this stage, the jacket is cooled by the air cooling, whereby only a small cooling capacity has to be provided to the jacket because it can heat up (in practice by up to 40° C.) without affecting the thickness measurement. The heat absorption of the base frame element due to the thermal radiation of the jacket is low in this temperature range, because both the radiating and the absorbing surfaces have a low emissivity factor or emissivity.

The air cooled in the cooling register flows directly in the interior of the base frame element to the sensors, so that both the base frame element and the sensors exhibit virtually no temperature fluctuation during operation.

As a result of the abovementioned measures, the effect of the ambient conditions on the thickness measurement is largely eliminated.

The largest remaining disturbance variable is the varying heating within a respective leg (on the side facing the second leg and on the side facing away from the second leg). Due to the length of the legs, differences in the range of a few $1/10°$ C. are enough to produce significant measurement errors. For this purpose, the temperatures at the relevant locations are measured and the effect on the thickness measurement is determined. During operation, the resulting error can be eliminated almost completely by factoring in a correction value.

Lastly, it must expressly be noted that the above described design example serves only to explain the claimed teaching, but does not limit said teaching to this design example.

The invention claimed is:

1. Device for determining the thickness of an object, the device comprising a frame having at least one leg, wherein the at least one leg comprises a sensor for contactless measuring of the distance to the object, wherein, in order to reduce a temperature effect on at least one of the frame or the sensor, the at least one leg has a structure consisting of a plurality of layers, wherein the plurality of layers includes a first layer that comprises a base frame element or is formed by such a base frame element, wherein a further layer comprises a radiation protection means for the first layer or a second layer or is formed by such a radiation protection means, and wherein the further layer is mounted on the first layer or on the second layer so as to be movable or displaceable relative to the first layer or the second layer.

2. Device according to claim 1, wherein the base frame element is configured as a hollow body.

3. Device according to claim 2, wherein the base frame element is such that a specifiable fluid can flow through it.

4. Device according to claim 3, wherein the fluid is ambient air.

5. Device according to claim 2, wherein an intermediate space through which a specifiable fluid, preferably ambient air, can flow is formed between the first layer and the second layer and/or between the second layer and the further layer in order to create a fluid layer.

6. Device according to claim 1, wherein the sensor is associated with the base frame element or is disposed in the base frame element.

7. Device according to claim 1, wherein the base frame element comprises a cooling device disposed in or on the base frame element.

8. Device according to claim 7, wherein the cooling device comprises a cooling register filled with a cooling medium.

9. Device according to claim 8, wherein a fluid flow is implemented by means of a forward flow from the cooling device to the sensor and a return flow from the sensor back to the cooling device.

10. Device according to claim 7, wherein the cooling device is disposed in a connecting piece of the base frame element.

11. Device according to claim 1, wherein a second layer comprises a substantially closed jacket for the first layer or is formed by such a jacket, wherein the return flow or the forward flow is implemented between the jacket and the base frame element.

12. Device according to claim 11, wherein the jacket is composed of a plurality of segments.

13. Device according to claim 11, wherein the jacket is made of a polished and/or shiny metal.

14. Device according to claim 13, wherein the polished and/or shiny metal has a low emissivity.

15. Device according to claim 1, wherein the further layer is mounted on the first layer or on the second layer so as to be movable or displaceable relative to the first layer or the second layer by means of a guide.

16. Device according to claim 15, wherein the guide is a slotted guide.

17. Device according to claim 1, wherein the radiation protection means is a radiation protection sheet.

18. Device according to claim 1, wherein at least one of the first layer or the second layer comprises a passage for sensor signals to and/or from the object.

19. Device according to claim 1, wherein the first layer is coupled to the second layer or the further layer and/or that the second layer is coupled to the further layer via a locally acting connecting means.

20. Device according to claim 1, wherein the device is a strip-shaped or plate-shaped object for use in a hot rolling process.

* * * * *